US012748342B2

(12) United States Patent
Seo et al.

(10) Patent No.: US 12,748,342 B2
(45) Date of Patent: Sep. 29, 2026

(54) CAMERA MODULE

(71) Applicant: LG INNOTEK CO., LTD., Seoul (KR)

(72) Inventors: Eun Sung Seo, Seoul (KR); Jung Goo Ji, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 283 days.

(21) Appl. No.: 18/577,794

(22) PCT Filed: Jul. 11, 2022

(86) PCT No.: PCT/KR2022/010054
§ 371 (c)(1),
(2) Date: Jan. 9, 2024

(87) PCT Pub. No.: WO2023/282724
PCT Pub. Date: Jan. 12, 2023

(65) Prior Publication Data
US 2024/0310698 A1 Sep. 19, 2024

(30) Foreign Application Priority Data
Jul. 9, 2021 (KR) ........................ 10-2021-0090567

(51) Int. Cl.
*G03B 13/36* (2021.01)
*G02B 27/00* (2006.01)
(Continued)

(52) U.S. Cl.
CPC ......... *G03B 13/36* (2013.01); *G02B 27/0006* (2013.01); *G02B 27/646* (2013.01);
(Continued)

(58) Field of Classification Search
None
See application file for complete search history.

(56) References Cited

U.S. PATENT DOCUMENTS 6,733,143 B1 * 5/2004 Anzai ...................... G02B 7/20 359/601
11,212,377 B2 12/2021 Jeon
(Continued)

FOREIGN PATENT DOCUMENTS

JP 2019-191350 A 10/2019
KR 10-2017-0006895 A 1/2017
(Continued)

OTHER PUBLICATIONS

International Search Report dated Nov. 2, 2022 in International Application No. PCT/KR2022/010054.

*Primary Examiner* — Jyotsna V Dabbi
(74) *Attorney, Agent, or Firm* — SALIWANCHIK, LLOYD & EISENSCHENK

(57) ABSTRACT

A camera module movably disposed in a receiving portion of a display device, and the camera module includes a housing disposed in the receiving portion; a lens part disposed in the housing; a driving part disposed in the receiving portion and the housing; and a sealing part disposed in the receiving portion, wherein the sealing part is disposed between an inner surface of the receiving portion and the housing, and wherein the sealing part includes a magnetic material.

19 Claims, 11 Drawing Sheets

(51) Int. Cl.
*G02B 27/64* (2006.01)
*G03B 5/00* (2021.01)

(52) U.S. Cl.
CPC ........ *G03B 5/00* (2013.01); *G03B 2205/0007* (2013.01); *G03B 2205/0069* (2013.01)

(56) References Cited

U.S. PATENT DOCUMENTS

| | | | | |
|---|---|---|---|---|
| 11,368,627 | B2 | 6/2022 | Choi | |
| 2020/0348479 | A1* | 11/2020 | Kwon | G03B 30/00 |
| 2021/0051221 | A1 | 2/2021 | Sim et al. | |
| 2021/0203854 | A1* | 7/2021 | Choi | H04N 23/80 |

FOREIGN PATENT DOCUMENTS

| | | | | |
|---|---|---|---|---|
| KR | 10-2019-0020474 | A | 3/2019 | |
| KR | 10-2019-0024110 | A | 3/2019 | |
| KR | 10-2021-0020568 | A | 2/2021 | |
| KR | 10-2021-0083982 | A | 7/2021 | |
| WO | WO-2014003493 | A1 * | 1/2014 | H04N 23/687 |
| WO | WO-2019045439 | A1 * | 3/2019 | H04N 23/55 |
| WO | WO-2019059737 | A1 * | 3/2019 | H04N 23/54 |

* cited by examiner

CAMERA MODULE

CROSS-REFERENCE TO RELATED APPLICATIONS

This application is the U.S. national stage application of International Patent Application No. PCT/KR2022/010054, filed Jul. 11, 2022, which claims the benefit under 35 U.S.C. § 119 of Korean Application No. 10-2021-0090567, filed Jul. 9, 2021, the disclosures of each of which are incorporated herein by reference in their entirety.

TECHNICAL FIELD

An embodiment relates to a camera module.

BACKGROUND ART

A camera modules perform a function of photographing objects and storing images or videos, and are installed in various applications. In particular, the camera module is manufactured in an ultra-small size and is applied to not only portable devices such as smartphones, tablet PCs, and laptops, but also drones and vehicles, providing various functions.

For example, an optical system and an optical module of the camera module may include an imaging lens that forms an image, and an image sensor that converts the formed image into an electrical signal. At this time, the camera module may perform an autofocus (AF) function that automatically adjusts the distance between the image sensor and the imaging lens to align the focal length of the lens. In addition, the camera module can perform a zooming function of zooming up or zooming out by increasing or decreasing a magnification of a distant object through a zoom lens.

In addition, the camera module uses image stabilization (IS) technology to correct or inhibit image shake caused by camera movement due to an unstable fixation device or the user's movement.

A most important element for this camera module to obtain an image is the imaging lens that forms the image. Recently, interest in high performance such as high image quality and high resolution has been increasing, and research is being conducted on optical systems that include multiple lenses to realize this. For example, research using a plurality of imaging lenses with positive (+) or negative (−) refractive power is being conducted to implement a high-performance optical system. However, when a plurality of lenses are included, the length of the entire optical system may increase, and there is a problem in that it is difficult to derive excellent optical and aberration characteristics.

Meanwhile, when the optical system and optical module include a plurality of lenses, zooming and autofocus (AF) functions, etc. can be performed by controlling the position of one of the plurality of lenses or by controlling the position of a lens group including two or more lenses. However, when the lens or the lens group is to perform the function, an amount of movement of the lens or the lens group may increase exponentially. Accordingly, a device including the optical system and optical module may require a lot of energy, and there is a problem that a design that takes the amount of movement into consideration is required.

Additionally, when the optical system and optical module include a plurality of lenses, an overall length and height of the optical system and optical module may increase depending on a thickness, spacing, and size of the plurality of lenses. Accordingly, the overall thickness and size of the device such as a smartphone and a mobile terminal including the optical system and optical module may increase, and it is difficult to provide them in smaller sizes.

Therefore, a new optical system and optical module that can solve the above-mentioned problems are required.

DISCLOSURE

Technical Problem

The embodiment provides a camera module that can improve reliability.

Additionally, the embodiment provides a camera module that can reduce the thickness of the display device.

Technical Solution

A camera module according to an embodiment is a camera module movably disposed in a receiving portion of a display device, and the camera module includes a housing disposed in the receiving portion; a lens part disposed in the housing; a driving part disposed in the receiving portion and the housing; and a sealing part disposed in the receiving portion, wherein the sealing part is disposed between an inner surface of the receiving portion and the housing, and wherein the sealing part includes a magnetic material.

The driving part of the camera module according to the embodiment includes a first driving part that moves the lens part in an optical axis direction in the housing; a second driving part that moves the lens part in a direction perpendicular to the optical axis in the housing; and a third driving part that moves the housing in the optical axis direction.

The third driving part of the camera module according to the embodiment includes a magnet disposed on the inner surface of the receiving portion; and a coil part disposed in the housing, wherein the sealing part is disposed between the magnet and the coil part.

Magnets of the first driving part and the second driving part of the camera module according to the embodiment are disposed in the housing, wherein the third driving part includes a magnet disposed on the inner surface of the receiving portion; and a coil part disposed in the housing, and wherein the sealing part is disposed between the inner surface of the receiving portion and the magnet of the first driving part or the magnet of the second driving part.

The third driving part of the camera module according to the embodiment includes a driving device and a guide member disposed on a lower surface of the receiving portion, wherein an upper portion of the third driving part includes a magnet disposed on the inner surface of the receiving portion, and wherein the sealing part is disposed between the magnet and the housing.

The camera module according to the embodiment is disposed in the receiving portion in an off mode in which a camera of the display device is not driven, and moves in the optical axis direction in the receiving portion in an on mode in which the camera of the display device is driven.

A moving distance of the housing of the camera module according to the embodiment moves a distance of 5 to 20 times a moving distance of the lens part.

The sealing part of the camera module according to the embodiment is disposed to surround the housing.

The driving part of the camera module according to the embodiment includes a magnet, and wherein the sealing part is coupled to the magnet by an attractive force of the magnet.

The sealing part of the camera module according to the embodiment includes a dispersant; magnetic particles dispersed in the dispersant; and a surfactant that disperses the magnetic particles.

The camera module further includes a first stopper extending from the inner surface of the receiving portion of the camera module according to the embodiment toward the housing, and a second stopper extending from an outer surface of the housing toward the inner surface of the receiving portion.

The camera module further includes a plurality of first stoppers extending from the inner surface of the receiving portion of the camera module according to the embodiment in a direction toward the housing and spaced apart in the optical axis direction, and wherein the sealing part is disposed between the plurality of first stoppers in the optical axis direction.

Effects of the Invention

A position of the camera module according to embodiments may be changed by driving a camera in the display device.

That is, in an on mode using the camera, the camera module may be disposed to protrude outside the display device.

At this time, in order to inhibit external impurities from flowing into the camera module, the camera module according to embodiments may include a sealing part that blocks external impurities.

Meanwhile, the sealing part contains a magnetic material, that is, a magnetic substance, and can be easily fixed by the magnet of the camera module.

Accordingly, the sealing part can block impurities from flowing into the camera module when the camera is driven in the display device.

Additionally, the sealing part contains flexible magnetic fluid, so that the sealing part is not damaged by movement of the camera module, and thus the reliability of the camera module can be improved.

Additionally, as a magnet for fixing the sealing part, an overall size of the camera module can be reduced by fixing it through a magnet for auto focusing or OIS rather than a separate magnet.

That is, the camera module according to the embodiment can have improved driving characteristics, achieve miniaturization, and have improved reliability.

BEST MODE

Hereinafter, embodiments of the present invention will be described in detail with reference to the accompanying drawings.

However, the spirit and scope of the present invention is not limited to a part of the embodiments described, and may be implemented in various other forms, and within the spirit and scope of the present invention, one or more of the elements of the embodiments may be selectively combined and redisposed. In addition, unless expressly otherwise defined and described, the terms used in the embodiments of the present invention (including technical and scientific terms may be construed the same meaning as commonly understood by one of ordinary skill in the art to which this invention belongs, and the terms such as those defined in commonly used dictionaries may be interpreted as having a meaning that is consistent with their meaning in the context of the relevant art. Further, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C". Further, in describing the elements of the embodiments of the present invention, the terms such as first, second, A, B, (a), and (b) may be used. These terms are only used to distinguish the elements from other elements, and the terms are not limited to the essence, order, or order of the elements. In addition, when an element is described as being "connected", "coupled", or "contacted" to another element, it may include not only when the element is directly "connected" to, "coupled" to, or "contacted" to other elements, but also when the element is "connected", "coupled", or "contacted" by another element between the element and other elements.

In addition, when described as being formed or disposed "on (over)" or "under (below)" of each element, the "on (over)" or "under (below)" may include not only when two elements are directly connected to each other, but also when one or more other elements are formed or disposed between two elements. Further, when expressed as "on (over)" or "under (below)", it may include not only the upper direction but also the lower direction based on one element.

Hereinafter, a camera module according to embodiments will be described with reference to the drawings.

Figure 1:
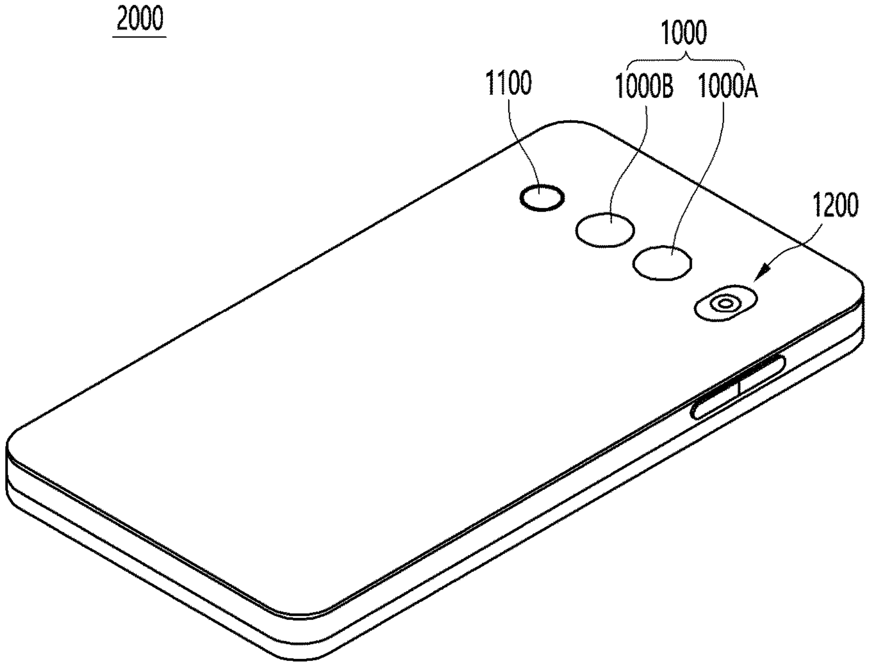
FIG. 1 is a view illustrating a display device to which a camera module according to an embodiment is applied.

FIG. 1 is a diagram illustrating a display device to which a camera module according to an embodiment is applied. In FIG. 1, a mobile terminal is shown as an example of a display device, but the embodiment is not limited thereto, and the camera module according to the embodiment can be applied to various display devices that display a screen.

Referring to FIG. 1, a display device 2000 may include a camera module 1000 provided at a rear surface.

The camera module 1000 may include an image capturing function. Additionally, the camera module 1000 may include at least one of an auto focus function, a zoom function, and an OIS function.

The camera module 1000 can process image frames of still images or moving images obtained by an image sensor unit in shooting mode or video call mode. The processed image frame may be displayed on a display unit (not shown) of the display device 2000 and may be stored in a memory (not shown). In addition, although not shown in the drawing, the camera module may be further disposed at a front surface of the display device 2000.

The camera module 1000 may include a first camera module 1000A and a second camera module 1000B.

Additionally, the display device 2000 may further include an autofocus device 1100. The autofocus device 1100 may include an autofocus function using a laser. The autofocus device 1100 can be mainly used in conditions where the autofocus function using the image of the camera module 1000 is deteriorated, for example, in close proximity of 10 m or less or in dark environments. The autofocus device 1100 may include a light emitting unit including a vertical cavity surface emitting laser (VCSEL) semiconductor device, and a light receiving unit such as a photo diode that converts light energy into electrical energy.

Additionally, the display device 2000 may further include a flash module 1200. The flash module 1200 may include a light emitting device inside that emits light. The flash module 1200 may emit light in the visible light wavelength band. For example, the flash module 1200 may emit white light or light of a color similar to white. However, the embodiment is not limited thereto, and the flash module 1200 may emit light of various colors. The flash module 1200 can be operated by operating a camera of a mobile terminal or by user control.

Figure 2:
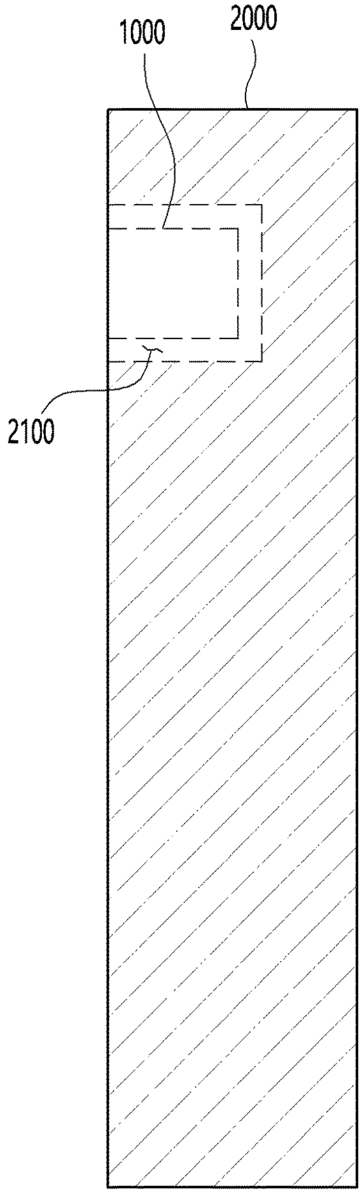
FIGS. 2 and 3 are views for explaining movement of a camera module in a display device according to an embodiment.
Figure 3:
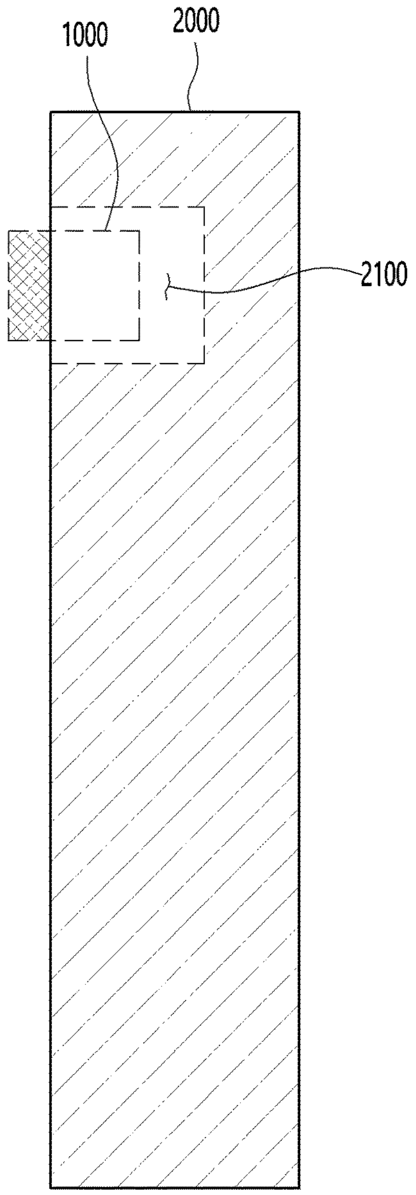

Referring to FIGS. 2 and 3, the camera module 1000 may be movably disposed in the display device 2000. In detail, the camera module 1000 may move in an optical axis direction of the camera module 1000 depending on whether the display device 2000 is turned on or off.

For example, the camera module 1000 may operate in two modes depending on whether the camera function is running in the display device. In detail, the camera module 1000 can operate in the display device 2000 in an off mode, a mode in which the camera is not used, and an on mode, a mode in which the camera is used.

The camera module 1000 may be disposed in different positions inside the display device 2000 depending on the modes.

Referring to FIG. 2, the camera module 1000 may be disposed in the display device 2000 in an off mode in which the display device 2000 does not use the camera. That is, the camera module 1000 can be disposed inserted into the display device 2000 in the off mode.

Additionally, referring to FIG. 3, the camera module 1000 may be disposed in a position different from the position in the off mode in an on mode in which the display device 2000 uses a camera. In detail, in the on mode, the camera module 1000 can move in the optical axis direction. In detail, in the on mode, the camera module 1000 can move a certain distance in the optical axis direction. Accordingly, the camera module 1000 may be disposed outside the display device 2000 in the on mode.

That is, the camera module 1000 moves a certain distance in the optical axis direction in the on mode, and as a result, the camera module can be disposed to partially protrude from a lower or upper surface of the display device 2000.

In the display device 2000, the position of the camera module 1000 that drives the camera may change depending on whether a camera is used in the display device 2000. As a result, the camera module can expand and utilize not only an internal space of the mobile terminal but also an external space as required by the number of lenses, spacing, or moving distance, so that the camera module with improved optical characteristics can be implemented in more diverse environments.

Meanwhile, when the camera moves to an outside of the display device 2000 in an on mode in which the display device 2000 uses a camera, an area in which the camera module is in contact with external impurities such as moisture and foreign substances may increase.

Accordingly, during use of the camera of the display device 2000, external impurities may contact the camera module or move into the interior of the camera module, as a result, the optical characteristics of the camera module may deteriorate or the driving characteristics of the internal actuator of the camera module may deteriorate.

Therefore, the camera module described below is a camera module with a new structure that can inhibit the penetration of external impurities as described above.

Figure 4:
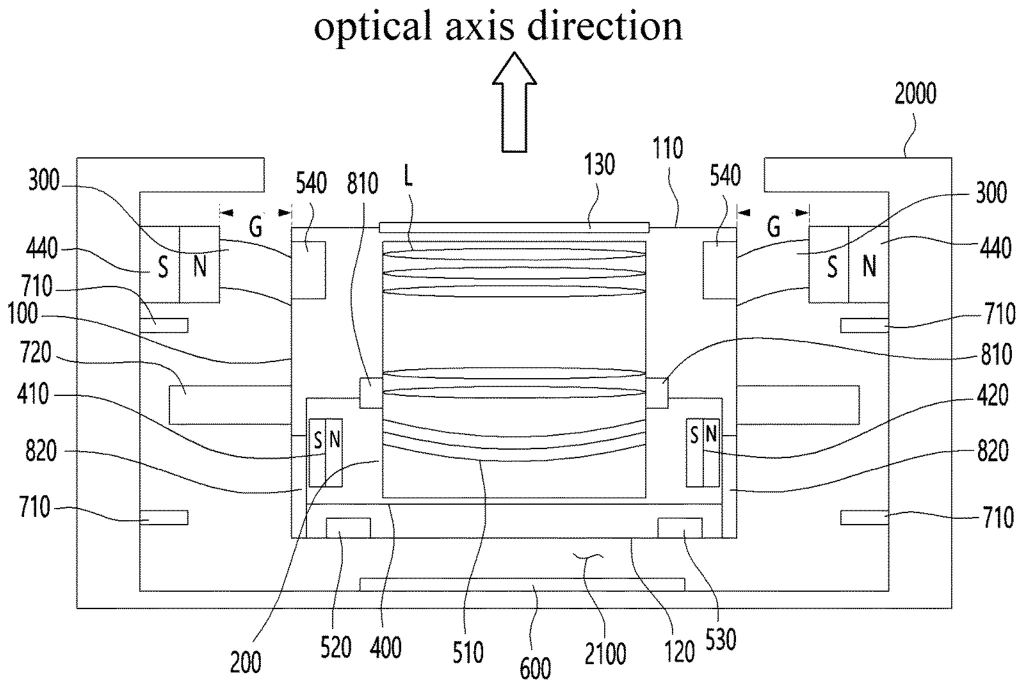
FIGS. 4 and 5 are cross-sectional views of a camera module according to a first embodiment.
Figure 5:
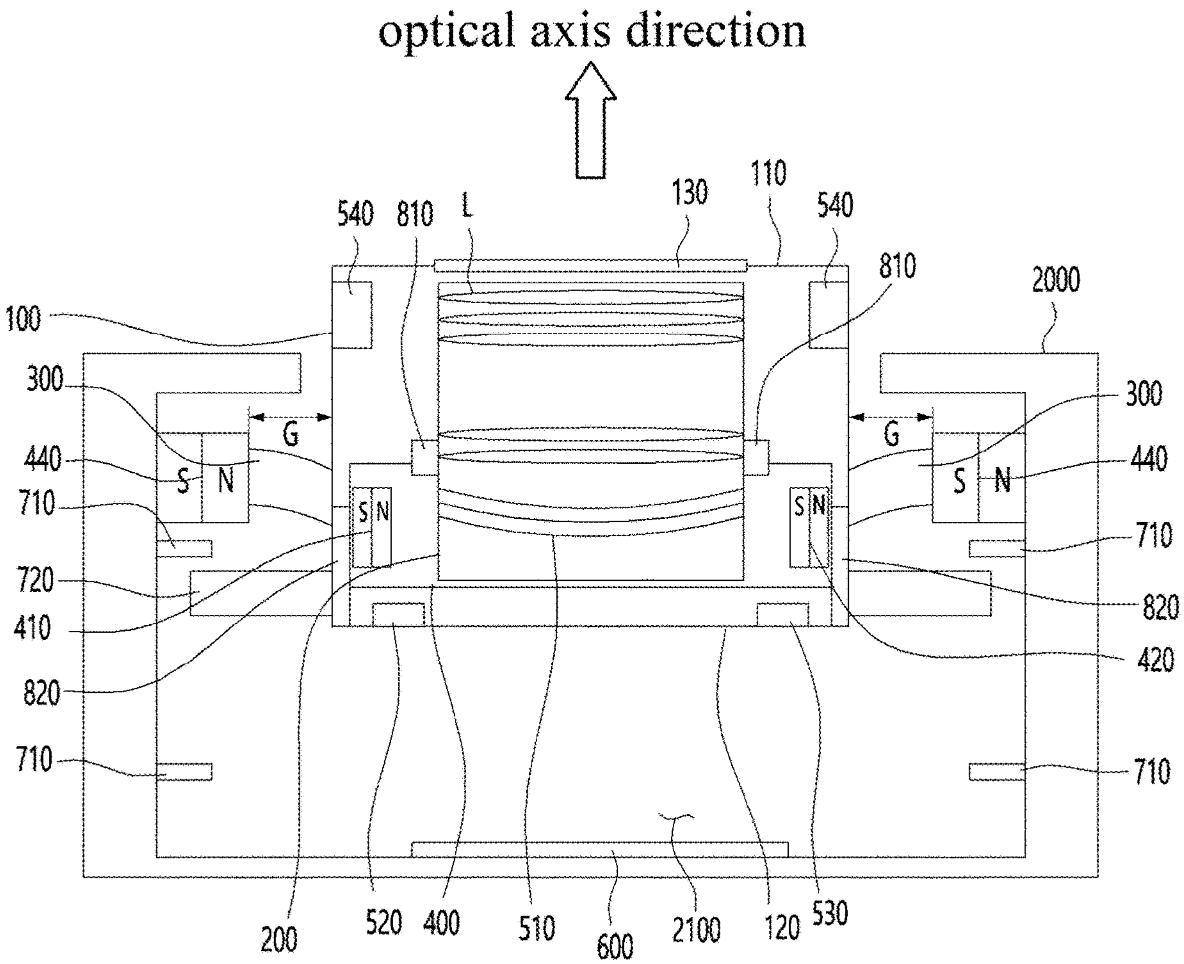

FIGS. 4 and 5 are cross-sectional views of a camera module according to a first embodiment. In detail, FIG. 4 is a view showing an arrangement of the camera module in the previously described off mode, and FIG. 5 is a view showing the arrangement of the camera module in the on mode.

Referring to FIGS. 4 and 5, the camera module 1000 according to the first embodiment may be inserted and disposed in the display device 2000. In detail, the camera module 1000 may be completely or partially inserted and disposed in the display device 2000.

In detail, referring to FIG. 2, the camera module 1000 may be entirely inserted and disposed in the display device 2000. Additionally, referring to FIG. 3, the camera module 1000 may be partially inserted into the display device 2000 and partially protruded from the outside of the display device 2000.

The display device 2000 may include a groove formed on an outer surface of the display device 2000. In detail, a groove in which the camera module 1000 is accommodated may be formed on a front surface (upper surface) and/or rear surface (lower surface) of the display device 2000.

Accordingly, an opening surface is formed by the groove on the front and/or rear surface of the display device 2000, and the display device 2000 may include a receiving portion 2100 having a depth in a thickness direction of the display device 2000 due to the opening surface.

The receiving portion 2100 formed in the display device 2000 can accommodate the camera module 1000.

The camera module 1000 may be disposed in the receiving portion 2100 of the display device 2000.

The camera module 1000 may include a housing 100, a lens part 200, a driving part, and a sealing part 300.

The housing 100 may be disposed in the receiving portion 2100 of the display device 2000. In detail, the housing 100 may be completely or partially disposed in the receiving portion 2100.

For example, as shown in FIG. 4, the housing 100 may be disposed only inside the receiving portion 2100. That is, in an off mode in which the camera of the display device 2000 is not driven, the housing 100 may be entirely disposed inside the receiving portion 2100.

Additionally, as shown in FIG. 5, the housing 100 may be disposed both inside and outside the receiving portion 2100. That is, in the on mode in which the camera of the display device 2000 is driven, the housing 100 may be disposed inside and outside the receiving portion 2100. That is, a portion of the housing 100 may be disposed to protrude outside the receiving portion 2100.

The housing 100 can accommodate the lens part 200 and the driving part. Accordingly, the lens part 200 and the driving part may also move together with the movement of the housing 100.

The housing 100 may be disposed to be movable.

In detail, the housing 100 may be movably disposed within the receiving portion 2100 of the display device 2000. For example, the housing 100 may move back and forth in the optical axis direction of the camera module 1000 by a driving force transmitted to the housing 100 from the outside of the housing 100.

Accordingly, when the driving force is not transmitted to the housing 100, the housing 100 and the lens part 200 disposed in the housing 100 may be fixedly disposed in the receiving portion 2100.

In addition, when the driving force is transmitted to the housing 100, the housing 100 and the lens part 200 disposed in the housing 100 may be moved and disposed a certain distance in the optical axis direction inside the receiving portion 2100. For example, the housing 100 may be disposed in the receiving portion 2100 by moving a distance of about 4 mm in the optical axis direction. In detail, the housing 100 may be arranged by moving a distance 5 to 20 times the distance that the lenses disposed in the housing 100 move for auto focusing (AF).

The housing 100 may include an opening region. In detail, the housing 100 may include an upper surface 110 facing the opening surface of the display device 2000 and a lower surface 120 facing the image sensor unit of the optical module. The upper surface 110 and the lower surface 120 may be disposed to face each other in the optical axis direction.

The upper surface 110 of the housing 100 may be partially open. In detail, the housing 100 may include a first opening region formed by partially opening the upper surface 110 of the housing 100.

Additionally, the lower surface 120 of the housing 100 may be partially open. In detail, the housing 100 may include a second opening region formed by partially opening the lower surface 120 of the housing 100.

The first opening region is formed in the housing 100, so that light can be incident on the optical module disposed inside the housing 100 through the first opening region OAL.

Additionally, the second opening area is formed in the housing 200, so that light moving into the housing 100 from the outside may pass through the optical module along the optical axis direction and be incident on the image sensor unit.

That is, the housing 100 includes a first opening region and a second opening region, so that light moving from the outside into the housing 100 may be incident on the image sensor unit after passing through the optical module along the optical axis direction.

A cover part 130 may be disposed in the first opening region. The cover part 130 may include a material that can transmit light. For example, the cover part 130 may include glass or plastic. Accordingly, light can move to an optical module disposed in the housing 100 through the cover part 1300.

When the housing 100 is disposed to protrude outside the display device 2000 as shown in FIG. 5, the cover part 130 can inhibit external impurities from penetrating into the optical module inside the housing 100. Additionally, the optical module disposed in the housing 100 can be protected from external impact.

The lens part 200 may be disposed in the receiving portion 2100 of the display device. In detail, the lens part 200 may be disposed in the housing 100 located in the receiving portion 2100.

Accordingly, the lens part 200 may move in a same direction as a movement direction of the housing 100 as the housing 100 moves.

The lens part 200 may include at least one lens that changes the characteristics of light incident on the camera module 1000. Additionally, an image sensor unit 600 through which light passing through the lens part 200 is incident may be disposed below the lens part 200.

Light incident on the camera module 1000 may pass through the lens part 200 and enter the image sensor unit 600 disposed below the lens part 200.

The image sensor unit 600 may include an image sensor. The image sensor may include a charge coupled device (CCD) or a complementary metal oxide semiconductor (CMOS). The image sensor unit 600 may collect light passing through the lens part 200 and convert it into an image. A center of the image sensor unit 600 may be arranged to coincide with the optical axis of the lenses of the lens part 200. That is, the optical axis of the image sensor unit 600 and the optical axis of the lenses of the lens part 200 may be aligned.

The lens part 200 may include one or more lenses. For example, the lens part 200 may include a plurality of lenses (L). The plurality of lenses may be coupled to and fixed to at least one lens barrel. For example, a plurality of lenses may be coupled to and fixed to a first lens barrel and a second lens barrel.

For example, at least one lens among a plurality of lenses may be coupled to the first lens barrel, and at least one lens among a plurality of lenses may be coupled to the second lens barrel.

The number of lenses coupled to the first lens barrel and the second lens barrel may be the same or different.

The plurality of lenses (L) may include glass or plastic. Additionally, the refractive power, refractive index, and shape of the plurality of lenses may be the same or different from each other.

At least one lens barrel among the first lens barrel and the second lens barrel may be arranged to be movable. In detail, any one of the first lens barrel and the second lens barrel may be capable of moving back and forth in the optical axis direction.

Accordingly, the camera module 1000 can perform an autofocus (AF) function that automatically adjusts the gap between the lens part 200 and the image sensor unit 600 to align the focal length of the lens, or a zooming function of zoom up or zoom out.

Additionally, the first lens barrel and the second lens barrel may be movable in a direction perpendicular to the optical axis direction. In detail, the first lens barrel and the second lens barrel may move in a first direction perpendicular to the optical axis direction and in a second direction that is different from the first direction and perpendicular to the optical axis direction.

Accordingly, the camera module 1000 can perform an optical image stabilizer (OIS) function.

In order to move the first lens barrel and the second lens barrel of the lens part 200, a driving part may be disposed at a position adjacent to the lens part 200.

In detail, the driving part may include a plurality of magnets and a plurality of coil parts for generating a driving force for movement of the first lens barrel and the second lens barrel.

For example, a magnet mounting portion 400 for fixing the magnet is disposed in the housing 100, and a plurality of magnets may be disposed on the magnet mounting portion 400. For example, a first magnet 410, a second magnet 420, and a third magnet may be disposed in the magnet mounting portion 400.

The first magnet 410, the second magnet 420, and the third magnet may be disposed on different sides of the magnet mounting portion 400, respectively. Any one of the first magnet 410, the second magnet 420 and the third magnet may be an AF magnet for moving any one of the first lens barrel and the second lens barrel in a direction perpendicular to the optical axis direction. In addition, the other two magnets among the first magnet 410, the second magnet 420, and the third magnet may be an OIS magnet for moving the first lens barrel and the second lens barrel in the first direction and the second direction.

Additionally, a plurality of coils that generate a driving force according to electromagnetic force together with the magnet may be disposed in the housing 100. For example, a first coil part 510, a second coil part 520, and a third coil part 530 may be disposed in the housing 100.

The first coil part 510 may be disposed outside a moving lens barrel among the first lens barrel and the second lens barrel. Alternatively, it may further include the coil mounting portion, and the lens part 200 may be inserted in the coil mounting portion after the first coil part 510 is disposed in the coil mounting portion.

The second coil part 520 and the third coil part 530 may be disposed in a lower portion of the housing 100.

When magnetic force is applied to the first magnet 410 and current flows through the first coil part 510, electromagnetic force may act according to Fleming's left-hand rule. That is, the first magnet 410 and the first coil part 510 may be the first driving part.

Accordingly, any one of the first lens barrel and the second lens barrel can move back and forth in the optical axis direction by the electromagnetic force.

In addition, when a magnetic force is applied to the second magnet 420 and a current flows in the second coil part 520, electromagnetic force may act according to Fleming's left-hand rule, and a magnetic force is applied to the third magnet 430. When a current flows through the third coil part 530, electromagnetic force may act according to Fleming's left-hand rule. That is, the second and third magnets and the second and third coil parts may be the second driving part.

Accordingly, the lens part 200 can move back and forth in the first direction and the second direction by the electromagnetic force.

Meanwhile, the camera module 1000 may include a first spring 810 that acts as elasticity and support when the lens part 200 moves in the optical axis direction, and a second spring 820 that serves as elasticity and support when the lens part 200 moves in the first and second directions.

As previously explained, the housing 100 can move back and forth in the optical axis direction. The camera module 1000 may further include a third driving part to move the housing 100 back and forth in the optical axis direction.

In detail, the third driving part may include a fourth magnet 440 and a fourth coil part 540. The fourth magnet 440 may be disposed on an inner surface of the receiving portion 2100.

At least one fourth magnet 440 may be disposed on the inner surface of the receiving portion 2100. For example, two fourth magnets 440 facing each other may be disposed on the inner surface of the receiving portion 2100.

Alternatively, three fourth magnets 440 may be disposed on the inner surface of the receiving portion 2100 at positions that do not face each other. Alternatively, four fourth magnets 440 facing each other may be disposed on the inner surface of the receiving portion 2100.

Additionally, the plurality of fourth magnets 440 may be formed integrally. In detail, the fourth magnet 440 may be disposed extending along the inner surface of the receiving portion 2100. That is, the plurality of fourth magnets 440 may be integrally formed while extending along a shape of the inner surface of the receiving portion 2100.

Additionally, the fourth coil part 540 may be disposed on the inner surface of the housing 100.

When magnetic force is applied to the fourth magnet 440 and current flows through the fourth coil part 540, electromagnetic force may act according to Fleming's left-hand rule.

Accordingly, the housing 100 can move back and forth in the optical axis direction by the electromagnetic force.

As the third driving part and the housing 100 are arranged to be spaced apart from each other, a gap G may be formed between the third driving part and the housing 100. That is, a gap G of a certain width may be formed between the fourth magnet 440 and the housing 100.

When the camera module 1000 operates, the housing 100 protrudes to the outside of the display device 2000 and may come into contact with external impurities or moisture, as shown in FIG. 5. Accordingly, some impurities and moisture may penetrate into the receiving portion 2100 through the space through which the housing protrudes, that is, the opening surface of the display device.

Accordingly, the camera module according to the embodiment may include a sealing part 300 that can inhibit penetration of moisture or impurities.

The sealing part 300 may be disposed in the receiving portion 2100. In detail, the sealing part 300 may be fixed and disposed in combination with another member in the receiving portion 2100.

The sealing part 300 may be disposed between the third driving part and the housing 100. In detail, the sealing part 300 may be disposed between the fourth magnet 440 and the housing 100. In detail, the sealing part 300 may be disposed between the fourth magnet 440 and the housing 100, surrounding the housing 100.

That is, the sealing part 300 may be arranged to surround the housing 100 so that the gap G between the fourth magnet 440 and the housing 100 is blocked from the outside.

The sealing part 300 may have magnetism. That is, the sealing part 300 may be a magnetic material. Accordingly, the sealing part 300 can be fixed and coupled by the fourth magnet 440. That is, the sealing part 300 has magnetism, as a result, since it is fixed to the fourth magnet 440 by an attractive force with the fourth magnet 440, a separate coupling member for fixing the sealing part 300 is not required.

To this end, the sealing part 300 may be disposed adjacent to the fourth magnet 440. Additionally, the sealing part 300 may be disposed between the housing 100 and the fourth magnet 440 and have a thickness less than or equal to the thickness of the fourth magnet 440. That is, the thickness of the sealing part 300 is disposed below the thickness of the fourth magnet 440, and accordingly, the magnetic sealing part 300 can be stably fixed by the fourth magnet 400.

For example, the sealing part 300 may include a magnetic fluid. In detail, the sealing part 300 may include a magnetic fluid including a dispersant such as water or ester, magnetic particles such as iron oxide, and a surfactant that disperses magnetic particles.

That is, the sealing part 300 may have fluidity. Accordingly, when the housing 100 reciprocates in the direction of the optical axis, the sealing part 300 may also move in the direction of movement of the housing 100. That is, the thickness and/or length of the sealing part 300 may change as the housing 100 moves.

Accordingly, it is possible to inhibit the sealing part 300 from being deformed due to movement of the housing 100 and thus deteriorating the sealing characteristics.

Meanwhile, FIGS. 4 and 5 illustrate that the sealing part 300 and the fourth coil part 540 are disposed facing each other, but the embodiment is not limited thereto.

In detail, the sealing part 300 may be arranged to face only the fourth magnet 440, and may not be arranged to face the fourth coil part 540. Accordingly, when electromagnetic force is generated between the fourth magnet 440 and the fourth coil part 540, interference by the sealing part 300 can be inhibited, and the housing 100 can be stably driven in the optical axis direction.

The sealing part 300 can inhibit impurities such as foreign substances or moisture from penetrating into the receiving portion 2100 during the movement of the housing 100. In detail, the sealing part 300 is disposed between the housing 100 and the fourth magnet 440, and accordingly, the gap G between the housing 100 and the fourth magnet 440 can be sealed from the outside.

Accordingly, the driving reliability of the camera module can be improved by inhibiting impurities from penetrating into the receiving portion during the movement of the housing.

Meanwhile, a plurality of stoppers may be disposed in the receiving portion 2100. In detail, a first stopper 710 extending from the inner surface of the receiving portion 2100 toward the housing 100 and a second stopper 720 extending from the outer surface of the housing 100 toward the inner surface of the receiving portion 2100 may be disposed in the receiving portion 2100.

The housing 100 can inhibit excessive movement by the first stopper 710 and the second stopper 720 when the housing 100 moves.

Hereinafter, a camera module according to the second embodiment will be described with reference to FIGS. 6 and 7. In the description of the camera module according to the second embodiment, description of the same configuration as the camera module according to the first embodiment described above will be omitted. Additionally, in the description of the camera module according to the second embodiment, the same reference numerals are assigned to the same components as the camera module according to the first embodiment described above.

Figure 6:
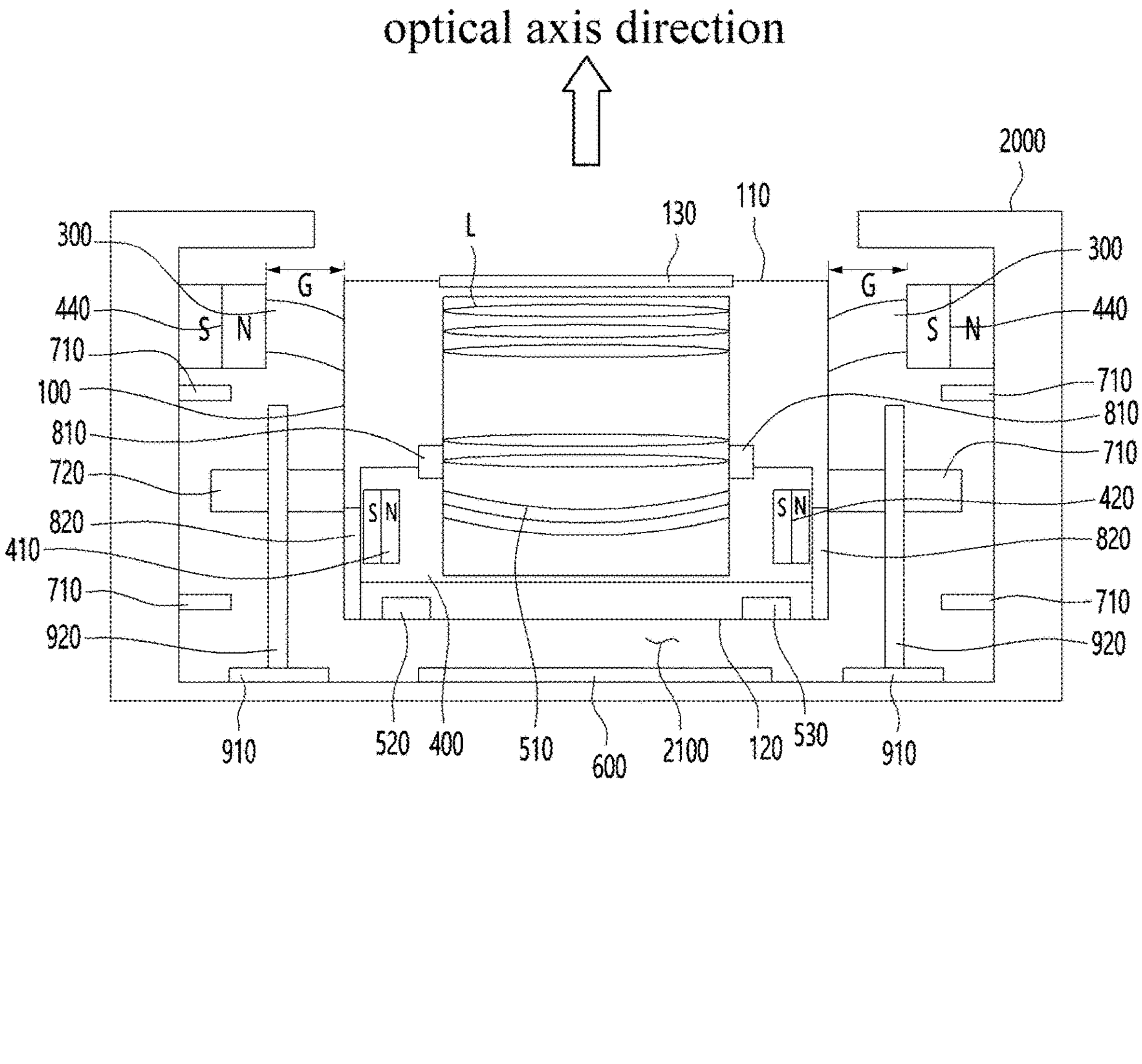
FIGS. 6 and 7 are cross-sectional views of a camera module according to a second embodiment.
Figure 7:
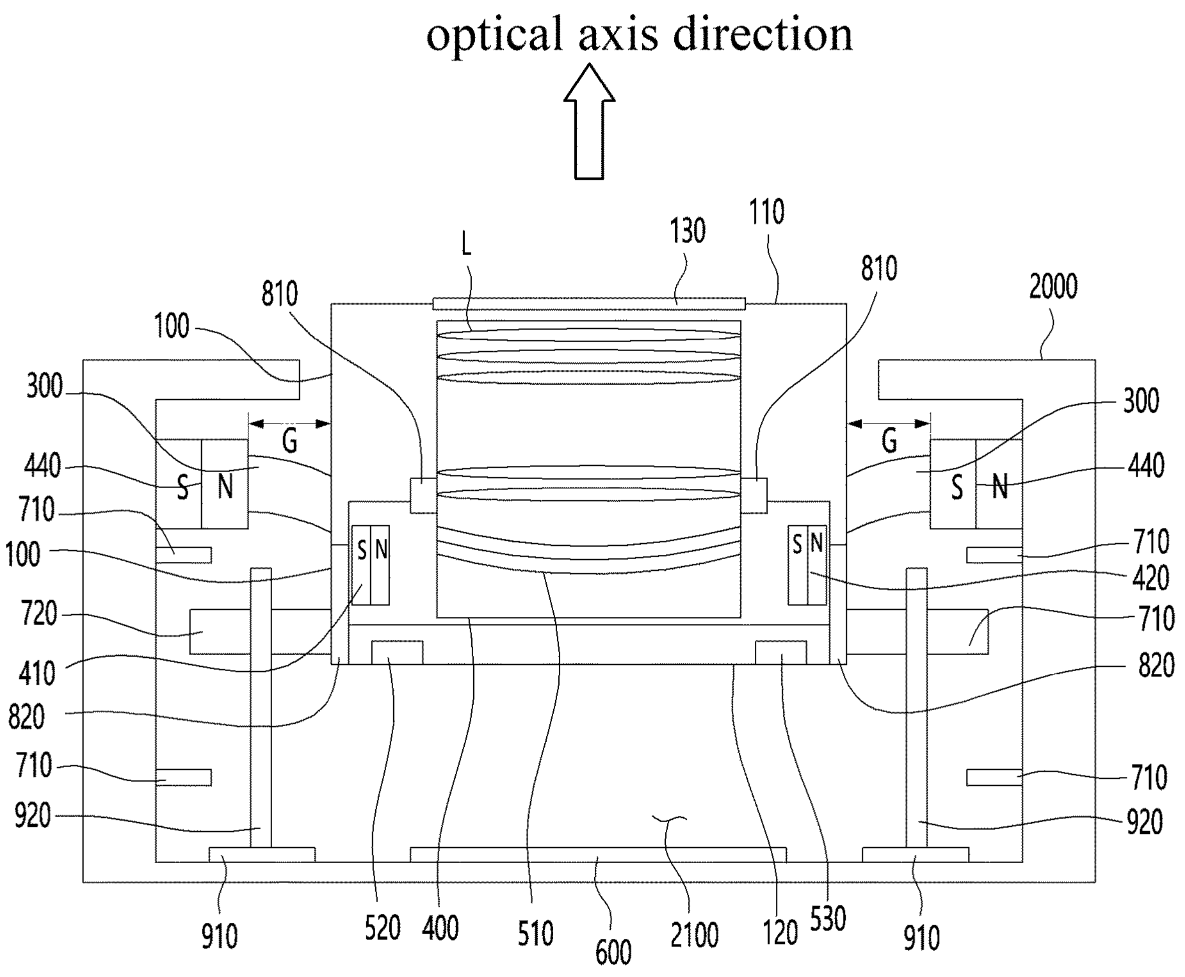

Referring to FIGS. 6 and 7, the camera module 1000 according to the second embodiment may be inserted and disposed in the display device 2000. In detail, the camera module 1000 may be completely or partially inserted and disposed in the display device 2000.

In detail, referring to FIG. 6, the camera module 1000 may be entirely inserted and disposed in the display device 2000. Additionally, referring to FIG. 7, the camera module 1000 may be partially inserted in the display device 2000 and partially protrude outside the display device 2000.

The display device 2000 may include a groove formed on an outer surface of the display device 2000. In detail, a groove in which the camera module 1000 is accommodated may be formed on the front surface (upper surface) and/or rear surface (lower surface) of the display device 2000.

Accordingly, an opening surface is formed by the groove on the front and/or rear surface of the display device 2000, and the display device 2000 may include a receiving portion 2100 having a depth in the thickness direction of the display device 2000 due to the opening surface.

The receiving portion 2100 formed in the display device 2000 can accommodate the camera module 1000.

The camera module 1000 may be disposed in the receiving portion 2100 of the display device 2000.

The camera module 1000 may include a housing 100, a lens part 200, a driving part, and a sealing part 300.

The housing 100 may be disposed in the receiving portion 2100 of the display device 2000. In detail, the housing 100 may be completely or partially disposed in the receiving portion 2100.

For example, as shown in FIG. 6, the housing 100 may be disposed only in the receiving portion 2100. That is, in an off mode in which the camera of the display device 2000 is not driven, the housing 100 may be entirely disposed inside the receiving portion 2100.

Additionally, as shown in FIG. 7, the housing 100 may be disposed both inside and outside the receiving portion 2100. That is, in the on mode in which the camera of the display device 2000 is driven, the housing 100 may be disposed inside and outside the receiving portion 2100. That is, a portion of the housing 100 may be disposed to protrude outside the receiving portion 2100.

The housing 100 can accommodate the lens part 200 and the driving part. Accordingly, the lens part 200 and the driving part may also move together with the movement of the housing 100.

The housing 100 may be arranged to be movable.

In detail, the housing 100 may be movably disposed in the receiving portion 2100 of the display device 2000. For example, the housing 100 may move back and forth in the optical axis direction of the camera module 1000 by a driving force transmitted to the housing 100 from the outside of the housing 100.

Accordingly, when the driving force is not transmitted to the housing 100, the housing 100 and the lens part 200 disposed in the housing 100 may be fixedly disposed in the receiving portion 2100.

In addition, when the driving force is transmitted to the housing 100, the housing 100 and the lens part 200 disposed in the housing 100 may be disposed in the receiving portion 2100 by moving a certain distance in the optical axis direction. For example, the housing 100 may be disposed in the receiving portion 2100 by moving a distance of about 4 mm in the optical axis direction. In detail, the housing 100 may be arranged by moving a distance 5 to 20 times the distance that the lenses disposed in the housing 100 move for auto focusing (AF).

The housing 100 may include an opening region. In detail, the housing 100 may include an upper surface 110 facing an opening surface of the display device 2000 and a lower surface 120 facing the image sensor unit of the optical module. The upper surface 110 and the lower surface 120 may be arranged to face each other in the optical axis direction.

The upper surface 110 of the housing 100 may be partially open. In detail, the housing 100 may include a first opening region formed by partially opening the upper surface 110 of the housing 100.

Additionally, the lower surface 120 of the housing 100 may be partially open. In detail, the housing 100 may include a second opening region formed by partially opening the lower surface 120 of the housing 100.

The first opening region is formed in the housing 100, so that light can be incident on the optical module disposed inside the housing 100 through the first opening region OAL.

Additionally, the second opening area is formed in the housing 200, so that light passing through the optical module disposed in the housing 100 may be incident on the image sensor unit through the second opening region.

That is, the housing 100 includes a first opening region and a second opening region, so that light moving from the outside into the housing 100 may be incident on the image sensor unit after passing through the optical module along the optical axis direction.

A cover part 130 may be disposed in the first opening region. The cover part 130 may include a material that can transmit light. For example, the cover part 130 may include glass or plastic. Accordingly, light can move to the optical module disposed inside the housing 100 through the cover part 1300.

When the housing 100 is disposed to protrude outside the display device 2000 as shown in FIG. 5, the cover part 130 can inhibit external impurities from penetrating into the optical module inside the housing 100. Additionally, the optical module disposed in the housing 100 can be protected from external impact.

The lens part 200 may be disposed in the receiving portion 2100 of the display device. In detail, the lens part 200 may be disposed inside the housing 100 located inside the receiving portion 2100.

Accordingly, the lens part 200 may move in a same direction as the movement direction of the housing 100 as the housing 100 moves.

The lens part 200 may include at least one lens that changes the characteristics of light incident on the camera module 1000. Additionally, an image sensor unit 600 through which light passing through the lens part 200 is incident may be disposed below the lens part 200.

Light incident on the camera module 1000 may pass through the lens part 200 and enter the image sensor unit 600 disposed below the lens part 200.

The lens part 200 may include one or more lenses. For example, the lens part 200 may include a plurality of lenses (L). The plurality of lenses may be coupled to and fixed to at least one lens barrel. For example, a plurality of lenses may be coupled to and fixed to the first lens barrel and the second lens barrel.

For example, at least one lens among a plurality of lenses may be coupled to the first lens barrel, and at least one lens among a plurality of lenses may be coupled to the second lens barrel.

The number of lenses coupled to the first lens barrel and the second lens barrel may be the same or different.

The plurality of lenses (L) may include glass or plastic. Additionally, the refractive power, refractive index, and shape of the plurality of lenses may be the same or different from each other.

At least one lens barrel among the first lens barrel and the second lens barrel may be arranged to be movable. In detail, any one of the first lens barrel and the second lens barrel may be capable of moving back and forth in the optical axis direction.

Accordingly, the camera module 1000 can perform an autofocus (AF) function that automatically adjusts the gap between the lens part 200 and the image sensor unit 600 to align the focal length of the lens, or a zooming function of zoom up or zoom out.

Additionally, the first lens barrel and the second lens barrel may be movable in a direction perpendicular to the optical axis direction. In detail, the first lens barrel and the second lens barrel may move in a first direction perpendicular to the optical axis direction and in a second direction that is different from the first direction and perpendicular to the optical axis direction.

Accordingly, the camera module 1000 can perform an optical image stabilizer (OIS) function.

In order to move the first lens barrel and the second lens barrel of the lens part 200, a driving part may be disposed at a position adjacent to the lens part 200.

In detail, the driving part may include a plurality of magnets and a plurality of coil parts for generating a driving force for movement of the first lens barrel and the second lens barrel.

For example, a magnet mounting portion 400 for fixing the magnet is disposed in the housing 100, and a plurality of magnets may be disposed on the magnet mounting portion 400. For example, a first magnet 410, a second magnet 420, and a third magnet may be disposed in the magnet mounting portion 400.

The first magnet 410, the second magnet 420, and the third magnet may be disposed on different sides of the magnet mounting portion 400, respectively. Any one of the first magnet 410, the second magnet 420 and the third magnet may be an AF magnet for moving any one of the first lens barrel and the second lens barrel in a direction perpendicular to the optical axis direction. In addition, the other two magnets among the first magnet 410, the second magnet 420, and the third magnet may be an OIS magnet for moving the first lens barrel and the second lens barrel in the first direction and the second direction.

Additionally, a plurality of coils that generate a driving force according to electromagnetic force together with the magnet may be disposed in the housing 100. For example, a first coil part 510, a second coil part 520, and a third coil part 530 may be disposed in the housing 100.

The first coil part 510 may be disposed outside a moving lens barrel among the first lens barrel and the second lens barrel. Alternatively, it may further include the coil mounting portion, and the lens part 200 may be inserted in the coil mounting portion after the first coil part 510 is disposed in the coil mounting portion.

The second coil part 520 and the third coil part 530 may be disposed in a lower portion of the housing 100.

When magnetic force is applied to the first magnet 410 and current flows through the first coil part 510, electromagnetic force may act according to Fleming's left-hand rule. That is, the first magnet 410 and the first coil part 510 may be the first driving part.

Accordingly, any one of the first lens barrel and the second lens barrel can move back and forth in the optical axis direction by the electromagnetic force.

In addition, when a magnetic force is applied to the second magnet 420 and a current flows in the second coil part 520, electromagnetic force may act according to Fleming's left-hand rule, and a magnetic force is applied to the third magnet 430. When a current flows through the third coil part 530, electromagnetic force may act according to Fleming's left-hand rule. That is, the second and third magnets and the second and third coil parts may be the second driving part.

Accordingly, the lens part 200 can move back and forth in the first direction and the second direction by the electromagnetic force.

Meanwhile, the camera module 1000 may include a first spring 810 that acts as elasticity and support when the lens part 200 moves in the optical axis direction, and a second spring 820 that serves as elasticity and support when the lens part 200 moves in the first and second directions.

As previously explained, the housing 100 can move back and forth in the direction of the optical axis. The camera module 1000 may further include a third driving part to move the housing 100 back and forth in the optical axis direction.

The third driving part may be disposed on a lower surface of the receiving portion 2100. In detail, the third driving part may include a driving device 910 and a guide member 920. The guide member 820 may be connected to a second stopper 720 connected to the housing 100. In detail, the second stopper 720 includes a hole into which the guide member 820 is inserted, and the guide member 820 can be inserted into the hole and connected to the second stopper 720.

The third driving part may include a piezoelectric device. In detail, the driving device 910 may include a piezoelectric device. A driving force is applied to the housing 100 by the third driving part including the piezoelectric device, and thereby the housing 100 can move forward and backward in the optical axis direction along the guide member 920.

Unlike the first embodiment, the camera module according to the second embodiment does not include a fourth coil part. That is, the camera module according to the second embodiment does not include a fourth coil part that generates a driving force to move the housing in the optical axis direction together with the fourth magnet.

Accordingly, since a separate fourth coil part is not disposed in the housing 100, an internal size of the housing 100 can be reduced. Additionally, since the weight of the moving housing 100 is reduced, the power for generating the driving force applied from the third driving part can be reduced.

In addition, it is possible to inhibit interference between the fourth coil part and other coil parts or other magnets within the housing 100, and accordingly, the characteristics of the autofocus (AF) function, zooming function, and optical image stabilizer (OIS) function can be improved.

In addition, the third driving part including the piezoelectric element is very small in size, unlike the third coil part, and accordingly, it can be arranged without being limited to a location within the receiving portion 2100.

As the third driving part and the housing 100 are arranged to be spaced apart from each other, a gap G may be formed between the third driving part and the housing 100. That is, a gap G of a certain width may be formed between the fourth magnet 440 and the housing 100.

When the camera module 1000 operates, the housing protrudes to the outside of the display device 2000 and may come into contact with external impurities or moisture, as shown in FIG. 3. Accordingly, some impurities and moisture may penetrate into the receiving portion 2100 through the space through which the housing protrudes, that is, the opening surface of the display device.

Accordingly, the camera module according to the embodiment may include a sealing part 300 that can inhibit penetration of moisture or impurities.

The sealing part 300 may be disposed in the receiving portion 2100. In detail, the sealing part 300 may be fixed and disposed in combination with another member in the receiving portion 2100.

The sealing part 300 may be disposed between the third driving part and the housing 100. In detail, the sealing part 300 may be disposed between the fourth magnet 440 and the housing 100. In detail, the sealing part 300 may be disposed between the fourth magnet 440 and the housing 100, surrounding the housing 100.

That is, the sealing part 300 may be arranged to surround the housing 100 so that the gap G between the fourth magnet 440 and the housing 100 is blocked from the outside.

The sealing part 300 may have magnetism. That is, the sealing part 300 may be a magnetic material. Accordingly, the sealing part 300 can be fixed and coupled by the fourth magnet 440. That is, the sealing part 300 has magnetism, as a result, since it is fixed to the fourth magnet 440 by an attractive force with the fourth magnet 440, a separate coupling member for fixing the sealing part 300 is not required.

To this end, the sealing part 300 may be disposed adjacent to the fourth magnet 440. Additionally, the sealing part 300 may be disposed between the housing 100 and the fourth magnet 440 and have a thickness less than or equal to the thickness of the fourth magnet 440. That is, the thickness of the sealing part 300 is disposed below the thickness of the fourth magnet 440, and accordingly, the magnetic sealing part 300 can be stably fixed by the fourth magnet 400.

For example, the sealing part 300 may include a magnetic fluid. In detail, the sealing part 300 may include a magnetic fluid including a dispersant such as water or ester, magnetic particles such as iron oxide, and a surfactant that disperses magnetic particles.

That is, the sealing part 300 may have fluidity. Accordingly, when the housing 100 reciprocates in the direction of the optical axis, the sealing part 300 may also move in the direction of movement of the housing 100. That is, the thickness and/or length of the sealing part 300 may change as the housing 100 moves.

Accordingly, it is possible to inhibit the sealing part 300 from being deformed due to movement of the housing 100 and thus deteriorating the sealing characteristics.

The sealing part 300 can inhibit impurities such as foreign substances or moisture from penetrating into the receiving portion 2100 during the movement of the housing 100. In detail, the sealing part 300 is disposed between the housing 100 and the fourth magnet 440, and accordingly, the gap G between the housing 100 and the fourth magnet 440 can be sealed from the outside.

Accordingly, the driving reliability of the camera module can be improved by inhibiting impurities from penetrating into the receiving portion during the movement of the housing.

Meanwhile, a plurality of stoppers may be disposed in the receiving portion 2100. In detail, a first stopper 710 extending from the inner surface of the receiving portion 2100 toward the housing 100 and a second stopper 720 extending from the outer surface of the housing 100 toward the inner surface of the receiving portion 2100 may be disposed in the receiving portion 2100.

The housing 100 can inhibit excessive movement by the first stopper 710 and the second stopper 720 when the housing 100 moves.

Hereinafter, a camera module according to the second embodiment will be described with reference to FIGS. 8 and 9. In the description of the camera module according to the third embodiment, description of the same configuration as the camera module according to the first and second embodiments described above will be omitted. Additionally, in the description of the camera module according to the third embodiment, the same reference numerals are assigned to the same components as the camera module according to the first and second embodiments described above.

Figure 8:
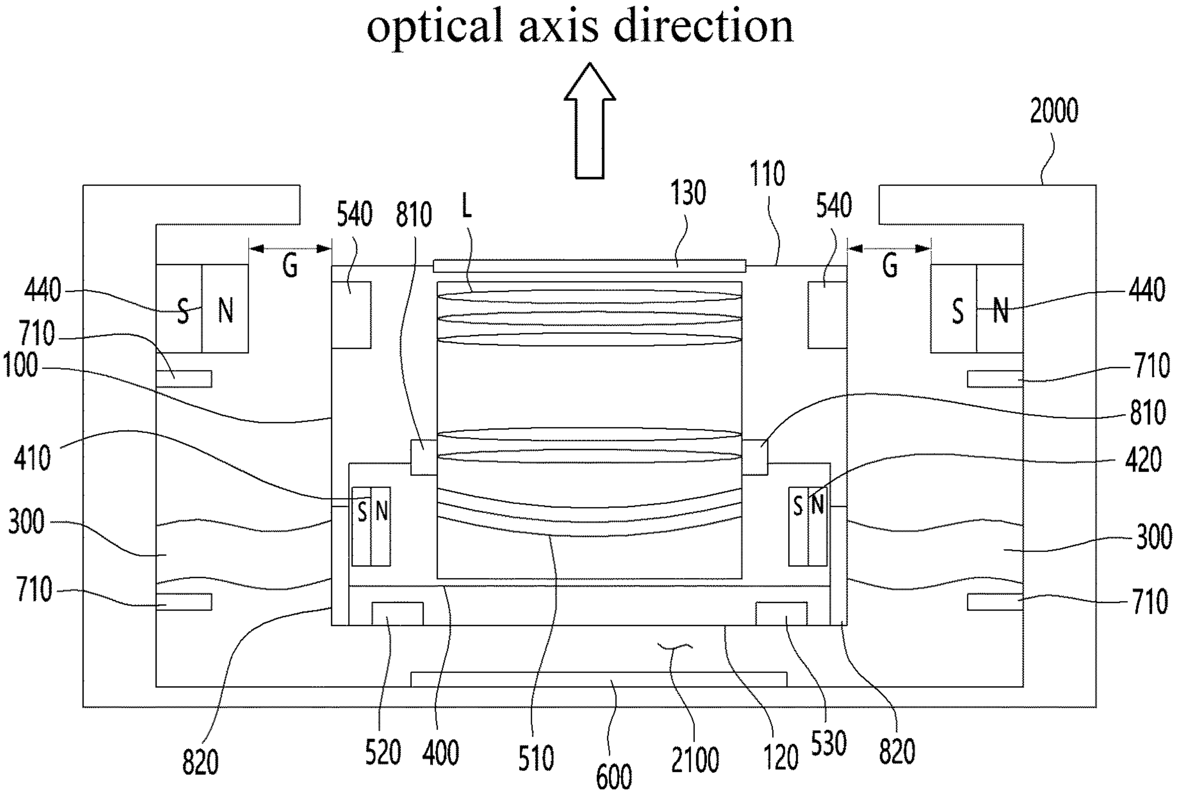
FIGS. 8 and 9 are cross-sectional views of a camera module according to a third embodiment.
Figure 9:
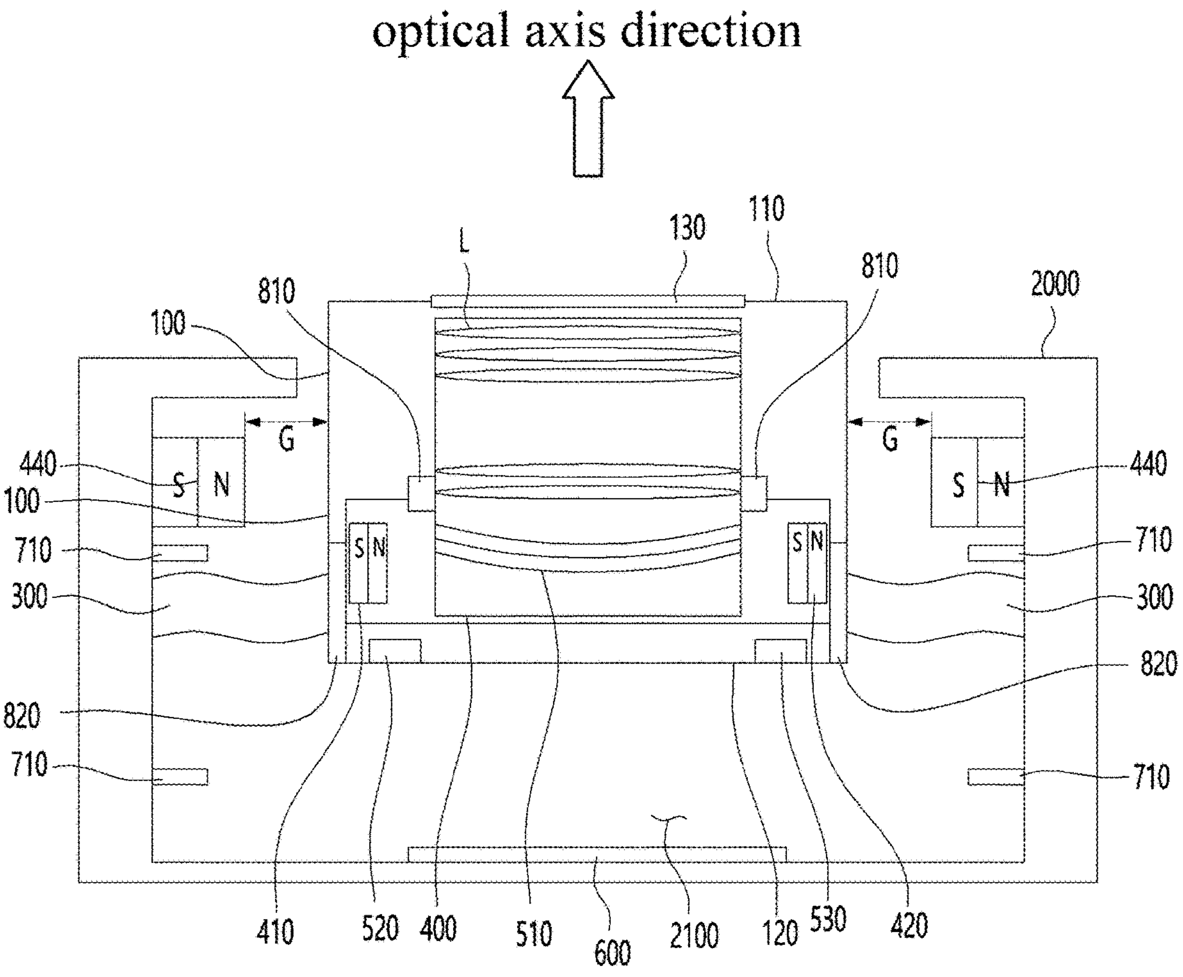

Referring to FIGS. 8 and 9, the camera module 1000 according to the third embodiment may be inserted and disposed in the display device 2000. In detail, the camera module 1000 may be completely or partially inserted and disposed in the display device 2000.

In detail, referring to FIG. 8, the camera module 1000 may be entirely inserted and disposed in the display device 2000. Additionally, referring to FIG. 9, the camera module 1000 may be partially inserted in the display device 2000 and partially protrude outside the display device 2000.

The display device 2000 may include a groove formed on an outer surface of the display device 2000. In detail, a groove in which the camera module 1000 is accommodated may be formed on the front surface (upper surface) and/or rear surface (lower surface) of the display device 2000.

Accordingly, an opening surface is formed by the groove on the front and/or rear surface of the display device 2000, and the display device 2000 may include a receiving portion 2100 having a depth in the thickness direction of the display device 2000 due to the opening surface.

The receiving portion 2100 formed in the display device 2000 can accommodate the camera module 1000.

The camera module 1000 may be disposed in the receiving portion 2100 of the display device 2000.

The camera module 1000 may include a housing 100, a lens part 200, a driving part, and a sealing part 300.

The housing 100 may be disposed in the receiving portion 2100 of the display device 2000. In detail, the housing 100 may be completely or partially disposed in the receiving portion 2100.

For example, as shown in FIG. 8, the housing 100 may be disposed only in the receiving portion 2100. That is, in an off mode in which the camera of the display device 2000 is not driven, the housing 100 may be entirely disposed inside the receiving portion 2100.

Additionally, as shown in FIG. 9, the housing 100 may be disposed both inside and outside the receiving portion 2100. That is, in the on mode in which the camera of the display device 2000 is driven, the housing 100 may be disposed inside and outside the receiving portion 2100. That is, a portion of the housing 100 may be disposed to protrude outside the receiving portion 2100.

The housing 100 can accommodate the lens part 200 and the driving part. Accordingly, the lens part 200 and the driving part may also move together with the movement of the housing 100.

The housing 100 may be arranged to be movable.

In detail, the housing 100 may be movably disposed in the receiving portion 2100 of the display device 2000. For example, the housing 100 may move back and forth in the optical axis direction of the camera module 1000 by a driving force transmitted to the housing 100 from the outside of the housing 100.

Accordingly, when the driving force is not transmitted to the housing 100, the housing 100 and the lens part 200 disposed in the housing 100 may be fixedly disposed in the receiving portion 2100.

In addition, when the driving force is transmitted to the housing 100, the housing 100 and the lens part 200 disposed in the housing 100 may be disposed in the receiving portion 2100 by moving a certain distance in the optical axis direction. For example, the housing 100 may be disposed in the receiving portion 2100 by moving a distance of about 4 mm in the optical axis direction. In detail, the housing 100 may be arranged by moving a distance 5 to 20 times the distance that the lenses disposed in the housing 100 move for auto focusing (AF).

The housing 100 may include an opening region. In detail, the housing 100 may include an upper surface 110 facing an opening surface of the display device 2000 and a lower surface 120 facing the image sensor unit of the optical module. The upper surface 110 and the lower surface 120 may be arranged to face each other in the optical axis direction.

The upper surface 110 of the housing 100 may be partially open. In detail, the housing 100 may include a first opening region formed by partially opening the upper surface 110 of the housing 100.

Additionally, the lower surface 120 of the housing 100 may be partially open. In detail, the housing 100 may include a second opening region formed by partially opening the lower surface 120 of the housing 100.

The first opening region is formed in the housing 100, so that light can be incident on the optical module disposed inside the housing 100 through the first opening region OAL.

Additionally, the second opening area is formed in the housing 200, so that light passing through the optical module disposed in the housing 100 may be incident on the image sensor unit through the second opening region.

That is, the housing 100 includes a first opening region and a second opening region, so that light moving from the outside into the housing 100 may be incident on the image sensor unit after passing through the optical module along the optical axis direction.

A cover part 130 may be disposed in the first opening region. The cover part 130 may include a material that can transmit light. For example, the cover part 130 may include glass or plastic. Accordingly, light can move to the optical module disposed inside the housing 100 through the cover part 1300.

When the housing 100 is disposed to protrude outside the display device 2000 as shown in FIG. 5, the cover part 130 can inhibit external impurities from penetrating into the optical module inside the housing 100. Additionally, the optical module disposed in the housing 100 can be protected from external impact.

The lens part 200 may be disposed in the receiving portion 2100 of the display device. In detail, the lens part 200 may be disposed inside the housing 100 located inside the receiving portion 2100.

Accordingly, the lens part 200 may move in a same direction as the movement direction of the housing 100 as the housing 100 moves.

The lens part 200 may include at least one lens that changes the characteristics of light incident on the camera module 1000. Additionally, an image sensor unit 600 through which light passing through the lens part 200 is incident may be disposed below the lens part 200.

Light incident on the camera module 1000 may pass through the lens part 200 and enter the image sensor unit 600 disposed below the lens part 200.

The lens part 200 may include one or more lenses. For example, the lens part 200 may include a plurality of lenses (L). The plurality of lenses may be coupled to and fixed to at least one lens barrel. For example, a plurality of lenses may be coupled to and fixed to the first lens barrel and the second lens barrel.

For example, at least one lens among a plurality of lenses may be coupled to the first lens barrel, and at least one lens among a plurality of lenses may be coupled to the second lens barrel.

The number of lenses coupled to the first lens barrel and the second lens barrel may be the same or different.

The plurality of lenses (L) may include glass or plastic. Additionally, the refractive power, refractive index, and shape of the plurality of lenses may be the same or different from each other.

At least one lens barrel among the first lens barrel and the second lens barrel may be arranged to be movable. In detail, any one of the first lens barrel and the second lens barrel may be capable of moving back and forth in the optical axis direction.

Accordingly, the camera module 1000 can perform an autofocus (AF) function that automatically adjusts the gap between the lens part 200 and the image sensor unit 600 to align the focal length of the lens, or a zooming function of zoom up or zoom out.

Additionally, the first lens barrel and the second lens barrel may be movable in a direction perpendicular to the optical axis direction. In detail, the first lens barrel and the second lens barrel may move in a first direction perpendicular to the optical axis direction and in a second direction that is different from the first direction and perpendicular to the optical axis direction.

Accordingly, the camera module 1000 can perform an optical image stabilizer (OIS) function.

In order to move the first lens barrel and the second lens barrel of the lens part 200, a driving part may be disposed at a position adjacent to the lens part 200.

In detail, the driving part may include a plurality of magnets and a plurality of coil parts for generating a driving force for movement of the first lens barrel and the second lens barrel.

For example, a magnet mounting portion 400 for fixing the magnet is disposed in the housing 100, and a plurality of magnets may be disposed on the magnet mounting portion 400. For example, a first magnet 410, a second magnet 420, and a third magnet may be disposed in the magnet mounting portion 400.

The first magnet 410, the second magnet 420, and the third magnet may be disposed on different sides of the magnet mounting portion 400, respectively. Any one of the first magnet 410, the second magnet 420 and the third magnet may be an AF magnet for moving any one of the first lens barrel and the second lens barrel in a direction perpendicular to the optical axis direction. In addition, the other two magnets among the first magnet 410, the second magnet 420, and the third magnet may be an OIS magnet for moving the first lens barrel and the second lens barrel in the first direction and the second direction.

Additionally, a plurality of coils that generate a driving force according to electromagnetic force together with the magnet may be disposed in the housing 100. For example, a first coil part 510, a second coil part 520, and a third coil part 530 may be disposed in the housing 100.

The first coil part 510 may be disposed outside a moving lens barrel among the first lens barrel and the second lens barrel. Alternatively, it may further include the coil mounting portion, and the lens part 200 may be inserted in the coil mounting portion after the first coil part 510 is disposed in the coil mounting portion.

The second coil part 520 and the third coil part 530 may be disposed in a lower portion of the housing 100.

When magnetic force is applied to the first magnet 410 and current flows through the first coil part 510, electromagnetic force may act according to Fleming's left-hand rule. That is, the first magnet 410 and the first coil part 510 may be the first driving part.

Accordingly, any one of the first lens barrel and the second lens barrel can move back and forth in the optical axis direction by the electromagnetic force.

In addition, when a magnetic force is applied to the second magnet 420 and a current flows in the second coil part 520, electromagnetic force may act according to Fleming's left-hand rule, and a magnetic force is applied to the third magnet 430. When a current flows through the third coil part 530, electromagnetic force may act according to Fleming's left-hand rule. That is, the second and third magnets and the second and third coil parts may be the second driving part.

Accordingly, the lens part 200 can move back and forth in the first direction and the second direction by the electromagnetic force.

Meanwhile, the camera module 1000 may include a first spring 810 that acts as elasticity and support when the lens part 200 moves in the optical axis direction, and a second spring 820 that serves as elasticity and support when the lens part 200 moves in the first and second directions.

As previously explained, the housing 100 can move back and forth in the direction of the optical axis. The camera module 1000 may further include a third driving part to move the housing 100 back and forth in the optical axis direction.

In detail, the third driving part may include a fourth magnet 440 and a fourth coil part 540. The fourth magnet 440 may be disposed on an inner surface of the receiving portion 2100.

At least one fourth magnet 440 may be disposed on the inner surface of the receiving portion 2100. For example, two fourth magnets 440 facing each other may be disposed on the inner surface of the receiving portion 2100.

Alternatively, three fourth magnets 440 may be disposed on the inner surface of the receiving portion 2100 at positions that do not face each other. Alternatively, four fourth magnets 440 facing each other may be disposed on the inner surface of the receiving portion 2100.

Additionally, the plurality of fourth magnets 440 may be formed integrally. In detail, the fourth magnet 440 may be disposed extending along the inner surface of the receiving portion 2100. That is, the plurality of fourth magnets 440 may be integrally formed while extending along a shape of the inner surface of the receiving portion 2100.

Additionally, the fourth coil part 540 may be disposed on the inner surface of the housing 100.

When magnetic force is applied to the fourth magnet 440 and current flows through the fourth coil part 540, electromagnetic force may act according to Fleming's left-hand rule.

Accordingly, the housing 100 can move back and forth in the optical axis direction by the electromagnetic force.

As the third driving part and the housing 100 are arranged to be spaced apart from each other, a gap G may be formed between the third driving part and the housing 100. That is, a gap G of a certain width may be formed between the fourth magnet 440 and the housing 100.

When the camera module 1000 operates, the housing 100 protrudes to the outside of the display device 2000 and may come into contact with external impurities or moisture, as shown in FIG. 9. Accordingly, some impurities and moisture may penetrate into the receiving portion 2100 through the space through which the housing protrudes, that is, the opening surface of the display device.

Accordingly, the camera module according to the embodiment may include a sealing part 300 that can inhibit penetration of moisture or impurities.

The sealing part 300 may be disposed in the receiving portion 2100. In detail, the sealing part 300 may be fixed and disposed in combination with another member in the receiving portion 2100.

The sealing part 300 may be disposed between the receiving portion 2100 and the housing 100. In detail, the sealing part 300 may be disposed between the inner surface of the receiving portion 2100 and the housing 100. That is, the sealing part 300 may be disposed below the fourth magnet 440, unlike the first embodiment described above.

The sealing part 300 may be arranged to surround the housing 100 so that the gap G between the receiving portion 2100 and the housing 100 is blocked from the outside.

The sealing part 300 may have magnetism. That is, the sealing part 300 may be a magnetic material. Accordingly, the sealing part 300 may be fixed by at least one magnet among the first magnet 410, the second magnet 420, and the third magnet 430. For example, the sealing part 300 may be fixed and coupled by the first magnet 410, the second magnet 420, and the third magnet 430. That is, the sealing part (300) has magnetism, thereby, it is fixed to the first magnet 410, the second magnet 420 and the third magnet 430 by the attractive force between the first magnet 410, the second magnet 420, and the third magnet 430, and accordingly, a separate coupling member for fixing the sealing part 300 is not required.

To this end, the sealing part 300 may be placed adjacent to the first magnet 410, the second magnet 420, and the third magnet 430. In addition, the sealing part 300 is disposed between the inner surface of the receiving portion 2100 and the first magnet 410, the second magnet 420, and the third magnet 430, furthermore, the sealing part 300 may be arranged to have a thickness less than or equal to the thickness of the first magnet 410, the second magnet 420, and the third magnet 430. That is, the thickness of the sealing part 300 is less than or equal to the thickness of the first magnet 410, the second magnet 420, and the third magnet 430, and accordingly, the magnetic sealing part 300 can be stably fixed by the first magnet 410, the second magnet 420, and the third magnet 430.

In the camera module according to the third embodiment, unlike the previously described embodiment, the sealing part 300 may be fixed by at least one of the first magnet 410, the second magnet 420, and the third magnet 430 rather than the fourth magnet 440.

Accordingly, when driving force is generated by the third driving part that drives the housing 100, it is possible to inhibit a decrease in driving force due to interference of the magnetic sealing part 300.

The sealing part 300 may include a magnetic fluid. In detail, the sealing part 300 may include a magnetic fluid including a dispersant such as water or ester, magnetic particles such as iron oxide, and a surfactant that disperses magnetic particles.

That is, the sealing part 300 may have fluidity. Accordingly, when the housing 100 reciprocates in the direction of the optical axis, the sealing part 300 may also move in the direction of movement of the housing 100. That is, the thickness and/or length of the sealing part 300 may change as the housing 100 moves.

Accordingly, it is possible to inhibit the sealing part 300 from being deformed due to movement of the housing 100 and thus deteriorating the sealing characteristics.

The sealing part 300 can inhibit impurities such as foreign substances or moisture from penetrating into the receiving portion 2100 during the movement of the housing 100. In detail, the sealing part 300 is disposed between the housing 100 and the fourth magnet 440, and accordingly, the gap G between the inner surface of the receiving portion 2100 and the housing 100 can be sealed from the outside.

Accordingly, the driving reliability of the camera module can be improved by inhibiting impurities from penetrating into the receiving portion during the movement of the housing.

Meanwhile, a plurality of stoppers may be disposed in the receiving portion 2100. In detail, a first stopper 710 extending from the inner surface of the receiving portion 2100 toward the housing 100 may be disposed in the receiving portion 2100.

Unlike the previously described embodiment, the camera module according to the third embodiment includes only one first stopper 710 and does not include a second stopper.

That is, a plurality of first stoppers 710 spaced apart in the optical axis direction may be disposed in the receiving portion 2100. Additionally, the sealing part may be disposed between a plurality of first stoppers 710 in the optical axis direction.

Accordingly, the sealing part 300, which moves together with the movement of the housing 100, can serve as a stopper, and the first stopper 710 disposed below the sealing part 300 and the fourth magnet 440 disposed above the sealing part 300 may control the movement of the housing 100, respectively.

Hereinafter, a camera module according to the fourth embodiment will be described with reference to FIGS. 10 and 11. In the description of the camera module according to the fourth embodiment, the description of the same configuration as the camera module according to the first, second, and third embodiments described above will be omitted. Additionally, in the description of the camera module according to the fourth embodiment, the same reference numerals are assigned to the same configuration as the camera module according to the first, second, and third embodiments described above.

Figure 10:
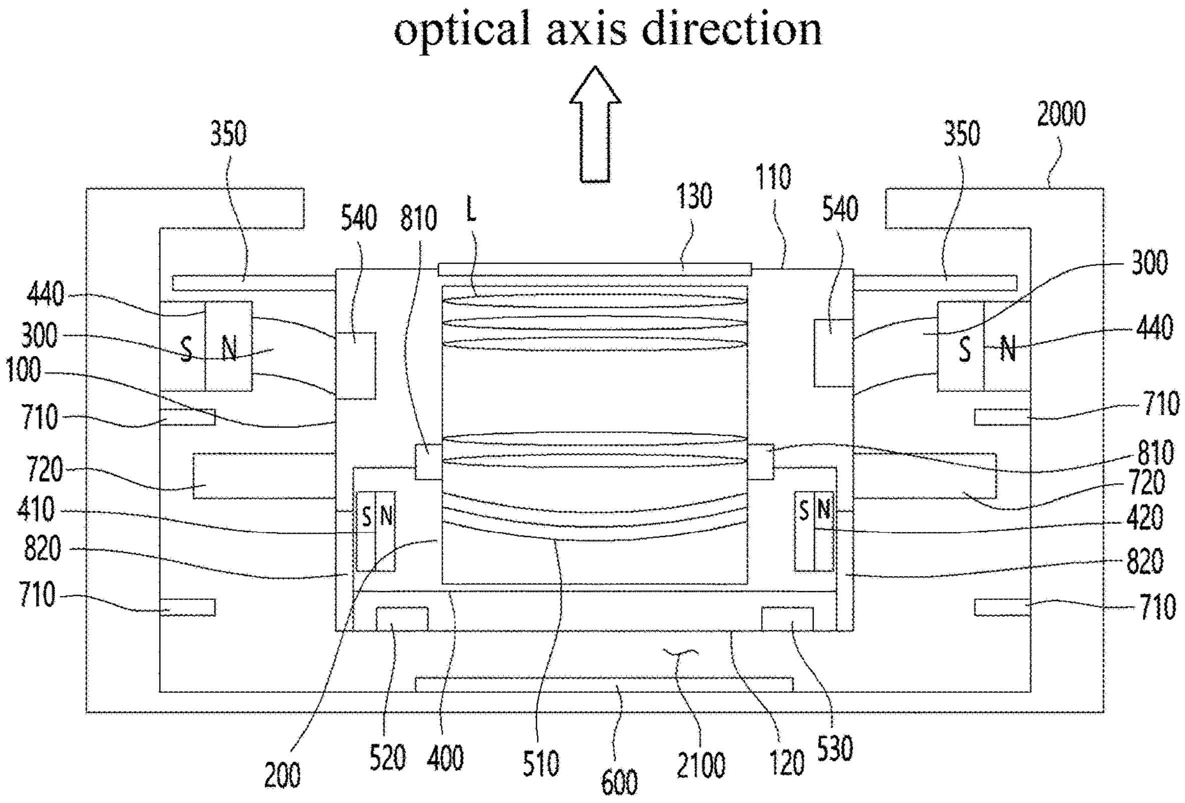
FIGS. 10 and 11 are cross-sectional views of a camera module according to a fourth embodiment.
Figure 11:
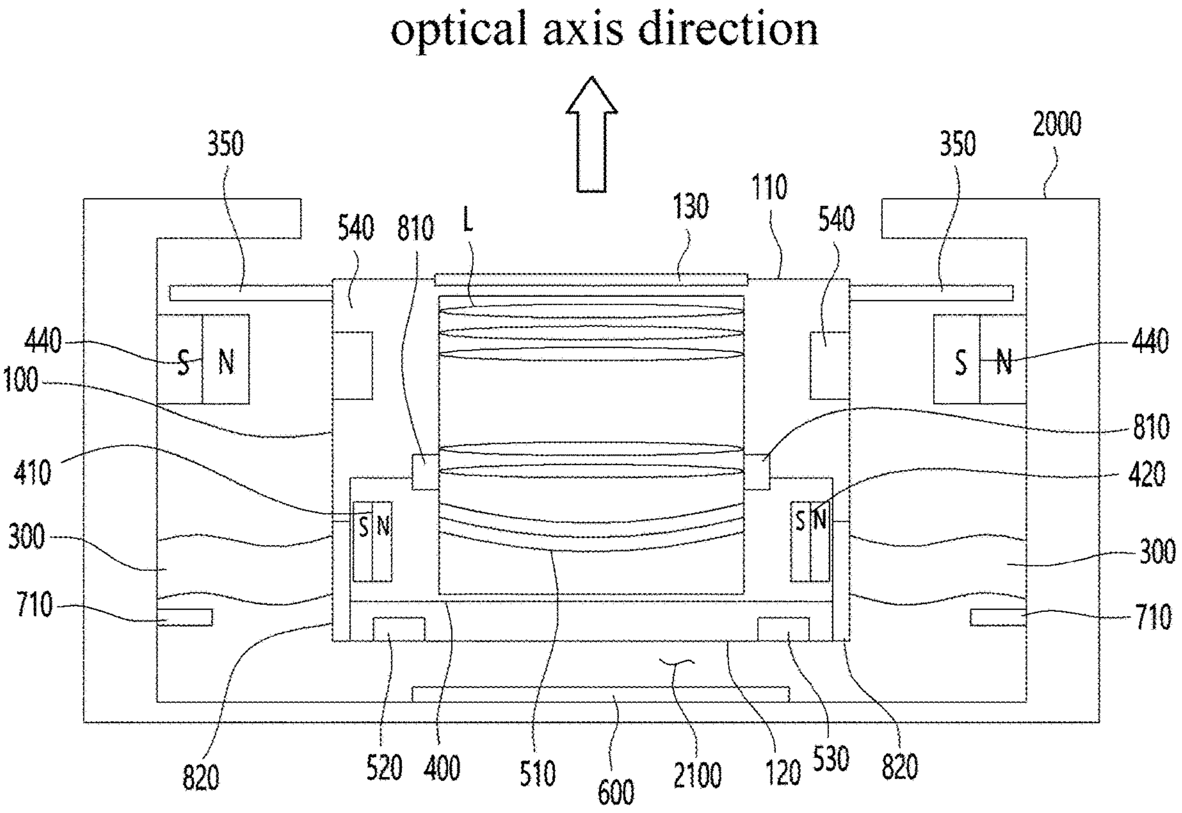

Referring to FIGS. 10 and 11, the camera module according to the fourth embodiment may further include a sealing protection part 350.

In detail, the camera module according to the fourth embodiment may be connected to the housing 100 and include a sealing protection part 350 disposed on an upper portion of the sealing part 300.

The sealing protection part 350 may extend from the housing 100 toward the inner surface of the receiving portion 2100. In detail, the sealing protection part 350 extends from the housing 100 toward the inner surface of the receiving portion 2100 and may be arranged to be spaced apart from the inner surface of the receiving portion 2100.

The sealing protection part 350 may serve to protect the sealing part 300. In detail, when a magnetic object approaches or is adjacent to the display device 2000, the sealing part 300 disposed in the receiving portion 2100 and having magnetism may be leaked to an outside by an external magnetic object.

Accordingly, it is possible to inhibit the sealing part 300 from leaking out of the display device due to the attractive force caused by the external magnetic object.

A position of the camera module according to embodiments may be changed by driving a camera in the display device.

That is, in an on mode using the camera, the camera module may be disposed to protrude outside the display device.

At this time, in order to inhibit external impurities from flowing into the camera module, the camera module according to embodiments may include a sealing part that blocks external impurities.

Meanwhile, the sealing part contains a magnetic material, that is, a magnetic substance, and can be easily fixed by the magnet of the camera module.

Accordingly, the sealing part can block impurities from flowing into the camera module when the camera is driven in the display device.

Additionally, the sealing part contains flexible magnetic fluid, so that the sealing part is not damaged by movement of the camera module, and thus the reliability of the camera module can be improved.

Additionally, as a magnet for fixing the sealing part, an overall size of the camera module can be reduced by fixing it through a magnet for auto focusing or OIS rather than a separate magnet That is, the camera module according to the embodiment can have improved driving characteristics, achieve miniaturization, and have improved reliability.

The characteristics, structures, effects, and the like described in the above-described embodiments are included in at least one embodiment, but are not limited to only one embodiment. Furthermore, the characteristic, structure, and effect illustrated in each embodiment may be combined or modified for other embodiments by a person skilled in the art. Therefore, it should be construed that contents related to such combination and modification are included in the scope of the embodiment.

Embodiments are mostly described above, but the embodiments are merely examples and do not limit the embodiments, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the embodiment defined in the following claims.

The invention claimed is:

1. A camera module movably disposed in a receiving portion of a display device, the camera module comprising:

a housing disposed in the receiving portion;

a lens part disposed in the housing;

a driving part disposed in the receiving portion and the housing; and a sealing part disposed in the receiving portion, wherein the sealing part is disposed between an inner surface of the receiving portion and the housing, wherein the sealing part includes a magnetic material, and wherein the driving part includes:

a first driving part configured to move the lens part in an optical axis direction in the housing;

a second driving part configured to move the lens part in a direction perpendicular to the optical axis direction in the housing; and a third driving part configured to move the housing in the optical axis direction.

2. The camera module of claim 1, wherein the third driving part includes:

a magnet disposed on the inner surface of the receiving portion; and a coil part disposed in the housing, wherein the sealing part is disposed between the magnet and the coil part.

3. The camera module of claim 1, wherein magnets of the first driving part and the second driving part are disposed in the housing, wherein the third driving part includes:

a magnet disposed on the inner surface of the receiving portion; and a coil part disposed in the housing, wherein the sealing part is disposed between the inner surface of the receiving portion and the magnet of the first driving part or the magnet of the second driving part.

4. The camera module of claim 3, comprising:

a plurality of first stoppers extending from the inner surface of the receiving portion toward the housing and spaced apart in the optical axis direction, and wherein the sealing part is disposed between the plurality of first stoppers in the optical axis direction.

5. The camera module of claim 1, wherein the third driving part includes a driving device and a guide member disposed on a lower surface of the receiving portion, wherein an upper portion of the third driving part includes a magnet disposed on the inner surface of the receiving portion, and wherein the sealing part is disposed between the magnet and the housing.

6. The camera module of claim 1, wherein the camera module is disposed in the receiving portion in an off mode in which a camera of the display device is not driven, and moves in the optical axis direction in the receiving portion in an on mode in which the camera of the display device is driven.

7. The camera module of claim 6, wherein a moving distance of the housing is 5 to 20 times a moving distance of the lens part.

8. The camera module of claim 1, wherein the sealing part is disposed to surround the housing.

9. The camera module of claim 1, wherein the driving part includes a magnet, and wherein the sealing part is coupled to the magnet by an attractive force of the magnet.

10. The camera module of claim 1, wherein the sealing part includes:

a dispersant;

magnetic particles dispersed in the dispersant; and a surfactant that disperses the magnetic particles.

11. The camera module of claim 1, comprising:

a first stopper extending from the inner surface of the receiving portion toward the housing, and a second stopper extending from an outer surface of the housing toward the inner surface of the receiving portion.

12. The camera module of claim 1, wherein the housing includes a first opening region provided at an upper portion of the housing and a second opening region provided at a lower portion of the housing.

13. The camera module of claim 12, comprising:

a cover part disposed on the first opening region.

14. The camera module of claim 1, wherein the lens part includes a first lens barrel including a plurality of lenses and a second lens barrel including a plurality of lenses, and wherein at least one of the first lens barrel and the second lens barrel is movably disposed.

15. The camera module of claim 1, wherein the first driving part includes a first magnet and a first coil part.

16. The camera module of claim 15, wherein the second driving part includes a second magnet, a third magnet, a second coil part, and a third coil part.

17. The camera module of claim 1, wherein a thickness or length of the sealing part changes depending on a movement of the housing.

18. The camera module of claim 1, comprising:

a plurality of stoppers disposed in the receiving portion.

19. A display device comprising:

a receiving portion; and a camera module disposed in the receiving portion and movable in an optical axis direction;

wherein the camera module comprises:

a housing disposed in the receiving portion;

a lens part disposed in the housing;

a driving part disposed in the receiving portion and the housing; and a sealing part disposed in the receiving portion, wherein the sealing part is disposed between an inner surface of the receiving portion and the housing, wherein the sealing part includes a magnetic material, and wherein the driving part includes:

a first driving part configured to move the lens part in an optical axis direction in the housing;

a second driving part configured to move the lens part in a direction perpendicular to the optical axis direction in the housing; and a third driving part configured to move the housing in the optical axis direction.

* * * * *